(12) United States Patent
Umesh et al.

(10) Patent No.: US 8,817,721 B2
(45) Date of Patent: Aug. 26, 2014

(54) MOBILE COMMUNICATION METHOD AND MOBILE STATION

(75) Inventors: Anil Umesh, Tokyo (JP); Mikio Iwamura, Tokyo (JP)

(73) Assignee: NTT DoCoMo, Inc., Tokyo (JP)

( * ) Notice: Subject to any disclaimer, the term of this patent is extended or adjusted under 35 U.S.C. 154(b) by 0 days.

(21) Appl. No.: 13/261,498

(22) PCT Filed: Apr. 28, 2011

(86) PCT No.: PCT/JP2011/060350
§ 371 (c)(1),
(2), (4) Date: Dec. 10, 2012

(87) PCT Pub. No.: WO2011/136314
PCT Pub. Date: Nov. 3, 2011

(65) Prior Publication Data
US 2013/0077577 A1    Mar. 28, 2013

(30) Foreign Application Priority Data

Apr. 30, 2010 (JP) ................................. 2010-106008

(51) Int. Cl.
| | |
|---|---|
| H04W 28/04 | (2009.01) |
| H04W 72/04 | (2009.01) |
| H04L 5/00 | (2006.01) |
| H04W 88/08 | (2009.01) |
| H04W 52/14 | (2009.01) |
| H04W 52/24 | (2009.01) |
| H04W 72/14 | (2009.01) |
| H04W 52/16 | (2009.01) |
| H04W 52/42 | (2009.01) |

(52) U.S. Cl.
CPC .............. *H04W 72/04* (2013.01); *H04W 52/16* (2013.01); *H04W 52/146* (2013.01); *H04W 52/42* (2013.01); *H04W 52/242* (2013.01); *H04W 72/14* (2013.01)
USPC ......................................................... 370/329

(58) Field of Classification Search
CPC ... H04W 28/04; H04W 72/04; H04W 72/042; H04W 88/08; H04L 5/0007
See application file for complete search history.

(56) References Cited

U.S. PATENT DOCUMENTS

| | | | | |
|---|---|---|---|---|
| 5,640,679 | A | * | 6/1997 | Lundqvist et al. ............ 455/525 |
| 5,771,451 | A | * | 6/1998 | Takai et al. .................... 455/442 |
| 6,445,917 | B1 | * | 9/2002 | Bark et al. ..................... 455/423 |

(Continued)

OTHER PUBLICATIONS

3GPP TS 25.215, titled "Technical Specification Group Radio Access Network Physical layer Measurements (FDD)(Release 9); V9.2.0 (Mar. 2010)," (3GPP 25215 hereinafter) was published as Technical Specification by 3rd Generation Partnership Project on Mar. 2010, pp. 01 through 23.*

(Continued)

*Primary Examiner* — Andrew Lai
*Assistant Examiner* — Hoyet H Andrews
(74) *Attorney, Agent, or Firm* — Osha Liang LLP

(57) ABSTRACT

A mobile communication method according to the present invention includes a step A of receiving, by the mobile station UE, "UL grant" for permitting the mobile station UE to transmit an uplink data signal in UL CC#1 through PDCCH in DL CC#2, and a step B of discarding, by the mobile station UE, the "UL grant" when transmission power of the UL CC#1 is controlled on the basis of path loss estimated from DL CC#1 in a deactive state.

4 Claims, 6 Drawing Sheets

(56) References Cited

U.S. PATENT DOCUMENTS

| | | | | |
|---|---|---|---|---|
| 2012/0281633 | A1* | 11/2012 | Kim et al. | 370/328 |
| 2013/0016676 | A1* | 1/2013 | Lohr et al. | 370/329 |
| 2013/0039202 | A1* | 2/2013 | Feuersanger et al. | 370/252 |
| 2013/0088983 | A1* | 4/2013 | Pragada et al. | 370/252 |
| 2013/0163543 | A1* | 6/2013 | Freda et al. | 370/329 |
| 2013/0183971 | A1* | 7/2013 | Tamaki et al. | 455/436 |
| 2013/0201851 | A1* | 8/2013 | Chou et al. | 370/252 |
| 2013/0201852 | A1* | 8/2013 | Chou et al. | 370/252 |

OTHER PUBLICATIONS

3GPP TS 36.214, titled "Technical Specification Group Radio Access Network Evolved Universal Terrestrial Radio Access (E-UTRA); V9.1.0, (Release 9)," (3GPP 36214 hereinafter) was published as Technical Specification by 3rd Generation Partnership Project on Mar. 2010, pp. 01 through 14.*

3GPP TS 36.300, titled Technical Specification Group Radio Access Network Evolved Universal Terrestrial Radio Access (E-UTRA) and Evolved Universal Terrestrial Radio Access Network(E-UTRAN)Overall description Stage 2 (Release 8) (3GPP 36300 hereinafter) was published as Technical Specification by 3rd Generation Partnership Project on Dec. 2009.*

3GPP TR 25.814, titled "Technical Specification Group Radio Access Network Physical layer aspects for evolved Universal Terrestrial Radio Access (UTRA); V7.1.0, Release 7," (3GPP TR 25.814 hereinafter) was published as Technical Report by 3rd Generation Partnership Project on Sep. 2006, pp. 01 through 132.*

3GPP TR 36.814 V9.0.0 (Mar. 2010)Technical Report (hereinafter 3GPP TR 36.814, titled "3rd Generation Partnership Project; Technical Specification Group Radio Access Network; Evolved Universal Terrestrial Radio Access (E-UTRA); Further advancements for E-UTRA physical layer aspects (Release 9)".*

3GPP TSG RAN WG2 #69, R2-101211, titled "Notification for DL CC Activation and Deactivation" (R2-101211 hereinafter) was presented in 3GPP TSG RAN WG2 #69, having a publication date of Feb. 22-26, 2010 at the RAN Working Group 2 Meeting in San Francisco.*

3GPP TR 36.912 V9.2.0 (Mar. 2010), Technical Report (hereinafter 3GPP TR 36.912, titled, 3rd Generation Partnership Project; Technical Specification Group Radio Access Network; Feasibility study for Further Advancements for E-UTRA (LTE-Advanced) (Release 9), having a publication date of Mar. 2010.*

3GPP TS 36.300, titled Technical Specification Group Radio Access Network Evolved Universal Terrestrial Radio Access (E-UTRA) and Evolved Universal Terrestrial Radio Access Network(E-UTRAN)Overall description Stage 2 (Release 8)(3GPP 36300 hereinafter) was published as Technical Specification by 3rd Generation Partnership Project on Dec. 2009.*

3GPP TR 36.814 V9.0.0 (Mar. 2010)Technical Report (hereinafter 3GPP TR 36.814, titled "3rd Generation Partnership Project; Technical Specification Group Radio Access Network; Evolved Universal Terrestrial Radio Access (E-UTRA); Further advancements for E-UTRA physical layer aspects (Release 9)", having a publication date of Mar. 2010.*

3GPP TSG Ran WG2 #69, R2-101211, titled "Notification for DL CC Activation and Deactivation " (R2-101211 hereinafter) was presented in 3GPP TSG RAN WG2 #69, having a publication date of Feb. 22-26, 2010 at the Ran Working Group 2 Meeting in San Francisco.*

3GPP TR 36.912 V9.2.0 (Mar. 2010), Technical Report (hereinafter 3GPP TR 36.912, titled, 3rd Generation Partnership Project; Technical Specification Group Radio Access Network; Feasibility study for Further Advancements for E-UTRA (LTE-Advanced) (Release 9).*

3GPP TR 25.814, titled "Technical Specification Group Radio Access Network Physical layer aspects for involved Universal Terrestrial Radio Access (UTRA); V7.1.0, Release 7," (3GPP TR 25.814 hereinafter) was published as Technical Report by 3rd Generation Partnership Project on Sep. 2006, pp. 01 through 132.*

3GPP TS 36.300, titled "Technical Specification Group Radio Access Network Evolved Universal Terrestrial Radio Access (E-UTRA) and Evolved Universal Terrestrial Radio Access Network(E-UTRAN)Overall description Stage 2 (Release 8)" (3GPP 36300 hereinafter) was published Technical Specification by 3rd Generation Partnership Project on Dec. 2009.*

Potevio; "Changed SI Transmission in CA"; 3GPP TSG RAN WG2 #69, R2-101043; San Franciso, USA Feb. 22-26, 2010 (2 pages).

Office Action issued in counterpart Korean Patent Application No. 10-2012-7029193 dated Feb. 26, 2014 (6 pages).

International Search Report issued in PCT/JP2011/060350 mailed Jul. 19, 2011, with English translation thereof (3 pages).

CATT; "Consideration on Radio Link Failure in CA"; 3GPP TSG RAN WG2 Meeting #67, R2-094324; Shenzhen, China; Aug. 24-26, 2009 (3 pages).

Nokia Siemens Networks et al.; "Uplink Power Control for LTE-Advanced"; 3GPP TSG RAN WG1 #59bis Meeting, R1-100322; Valencia, Spain; Jan. 18-22, 2010 (8 pages).

Potevio; "Changed SI Transmission in CA"; 3GPP TSG RAN WG2 #69, R2-101043; San Franciso, USA' Feb. 22-26, 2010 (2 pages).

Potevio; "Notification for DL CC Activation and Deactivation"; 3GPP TSG RAN WG2 #69, R2-101211; San Francisco, USA; Feb. 22-26, 2010 (2 pages).

3GPP TS 36.133 V11.2.0; "3rd Generation Partnership Project; Technical Specification Group Radio Access Network; Evolved Universal Terrestrial Radio Access (E-UTRA); Requirements for support of radio resource management (Release 11)"; Sep. 2012 (672 pages).

3GPP TS 36.321 V11.0.0; "3rd Generation Partnership Project; Technical Specification Group Radio Acess Network; Evolved Universal Terrestrial Radio Access (E-UTRA); Medium Access Control (MAC) protocol specification (Release 11)"; Sep. 2012 (55 pages).

\* cited by examiner

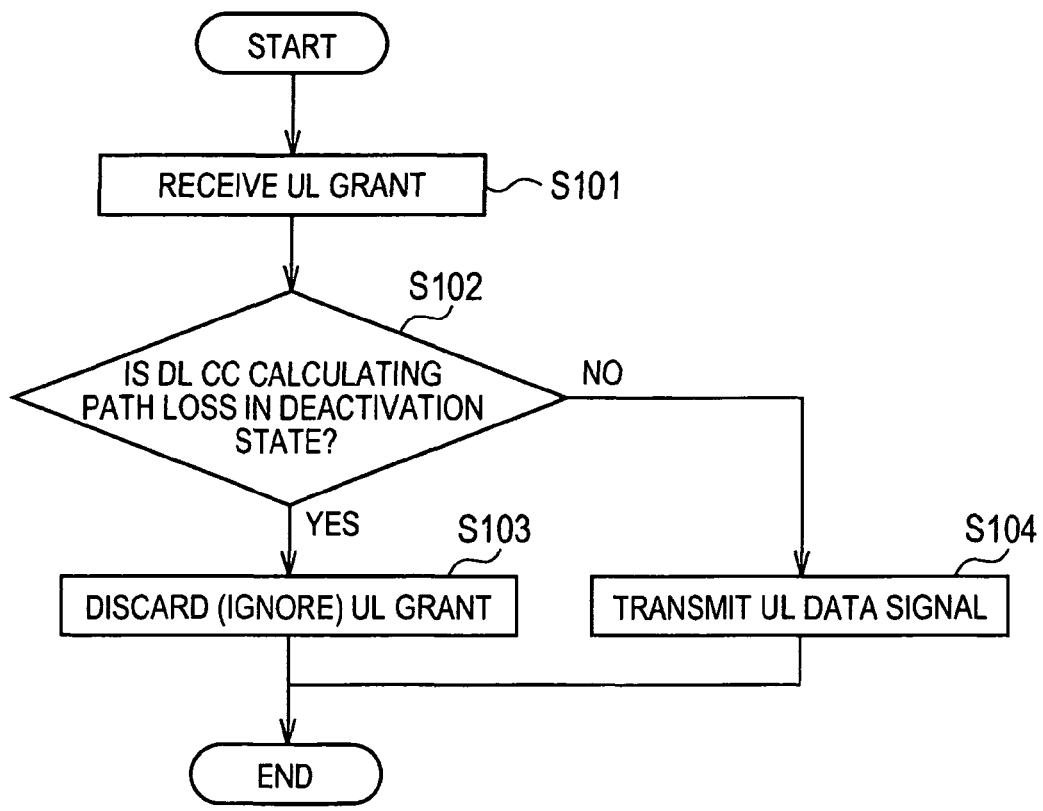

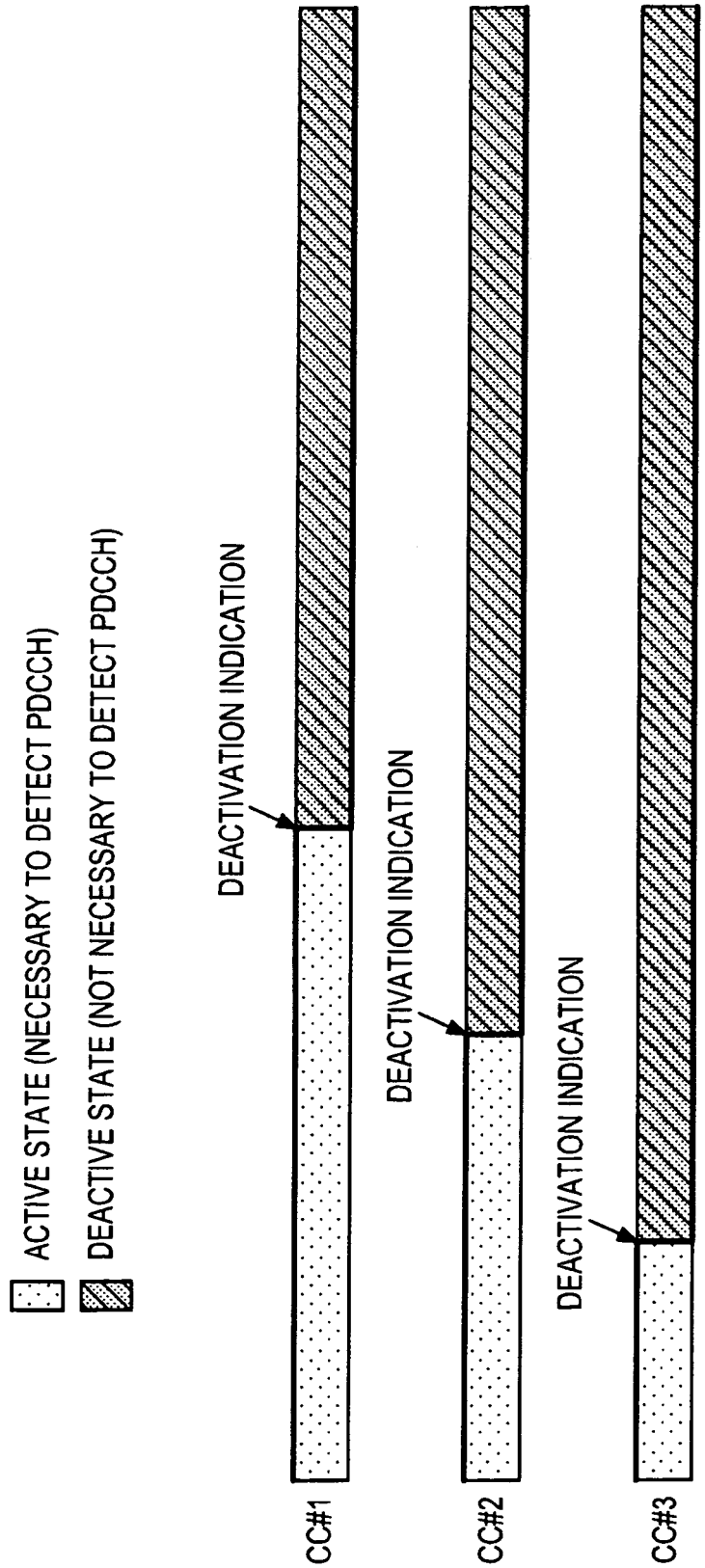

MOBILE COMMUNICATION METHOD AND MOBILE STATION

TECHNICAL FIELD

The present invention relates to a mobile communication method and a mobile station.

BACKGROUND ART

In an LTE-Advanced scheme, a mobile station UE is configured to be able to perform a CA (Carrier Aggregation) communication with a radio base station eNB by using a plurality of DL CCs (Downlink Component Carriers) and a plurality of UL CCs (Uplink Component Carriers), which have carrier frequencies different from each other.

As illustrated in FIG. 7, in the LTE-Advanced scheme, each CC used in the CA communication can be set in an active state or a deactive state.

Furthermore, in the LTE-Advanced scheme, the mobile station UE is configured to control transmission power in PUSCH (Physical Uplink Shared Channel, an uplink shared channel), transmission power in PUCCH (Physical Uplink Control Channel, an uplink control channel), transmission power of SRS (Sounding Reference Signal), transmission power in PRACH (Physical Random Access Channel), and the like on the basis of path loss (Pathloss) estimated from predetermined DL CC.

Furthermore, the mobile station UE is configured to calculate the path loss in the predetermined DL CC by using the difference between transmission power (Resource Element unit) of a downlink common pilot signal (a cell-specific reference signal) in the radio base station eNB and received power (Resource Element unit) of the downlink common pilot signal in the mobile station UE.

In addition, the transmission power of the downlink common pilot signal in the radio base station eNB is broadcasted by the radio base station eNB.

Furthermore, there has been a discussion that the mobile station UE is notified from the radio base station eNB of from which DL CC the path loss used for controlling the transmission power in each UL CC should be calculated.

However, the applicant found the following problems in the aforementioned LTE-Advanced scheme.

In the LTE-Advanced scheme, the mobile station UE does not frequently monitor DL CC in a deactive state, and thus it is not possible to ensure the estimation accuracy of path loss in the DL CC.

Therefore, it is not possible to ensure the accuracy of transmission power control of UL CC based on the path loss, and thus there is a problem that the transmission of an uplink signal in the UL CC may be an additional interference factor.

Therefore, the present invention has been achieved in view of the above-described problems, and an object thereof is to provide a mobile communication method and a mobile station, by which it is possible to reduce interference in a CA communication.

SUMMARY OF THE INVENTION

A first characteristic of the present embodiment is summarized in that a mobile communication method, in which a mobile station communicates with a radio base station by using a plurality of downlink carriers and a plurality of uplink carriers, each of which has a different carrier frequency, includes: a step A of receiving, by the mobile station, a scheduling signal for permitting the mobile station to transmit an uplink data signal in a predetermined uplink carrier through a physical downlink control channel in a first downlink carrier; and a step B of discarding, by the mobile station, the scheduling signal when transmission power of the predetermined uplink carrier is controlled on the basis of path loss estimated from a second downlink carrier in a deactive state.

A second characteristic of the present embodiment is summarized in that a mobile station configured to be capable of communicating with a radio base station by using a plurality of downlink carriers and a plurality of uplink carriers, each of which has a different carrier frequency, includes: a reception unit configured to receive a scheduling signal for permitting the mobile station to transmit an uplink data signal in a predetermined uplink carrier through a physical downlink control channel in a first downlink carrier, wherein, when transmission power of the predetermined uplink carrier is controlled on the basis of path loss estimated from a second downlink carrier in a deactive state, the reception unit is configured to discard the scheduling signal.

As described above, according to the present invention, it is possible to provide a mobile communication method and a mobile station, by which it is possible to reduce interference in a CA communication.

BRIEF DESCRIPTION OF DRAWINGS

FIG. 6 is a flowchart illustrating an operation of the mobile station according to the first embodiment of the present invention.

FIG. 7 is a diagram for explaining a conventional mobile communication system.

DESCRIPTION OF EMBODIMENTS (Mobile Communication System According to First Embodiment of the Present Invention)

A description will now be provided for the configuration of a mobile communication system according to a first embodiment of the present invention, with reference to FIG. 1 to FIG. 6.

The mobile communication system according to the present embodiment is an LTE-Advanced mobile communication system, and in the mobile communication system according to the present embodiment, a mobile station UE is configured to be able to perform a CA communication with a radio base station eNB by using a plurality of CCs having different carrier frequencies.

Figure 1:
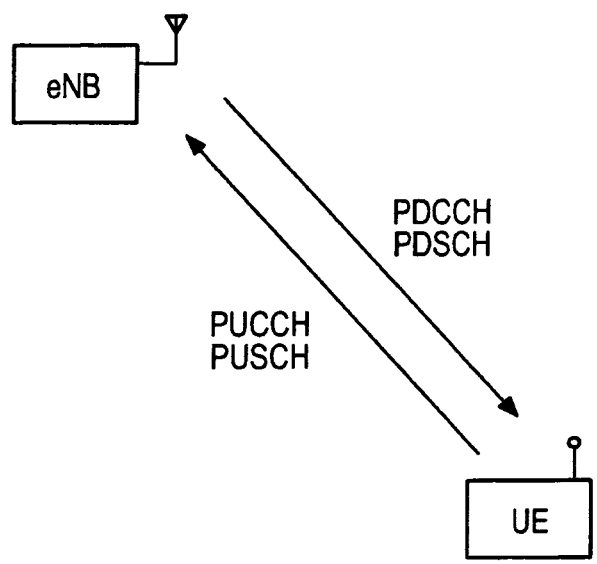
FIG. 1 is a diagram showing the entire configuration of a mobile communication system according to a first embodiment of the present invention.

As illustrated in FIG. 1, in the mobile communication system according to the present embodiment, the mobile station UE is configured to transmit an uplink data signal through PUSCH (Physical Uplink Shared Channel, an uplink shared channel), and to transmit an uplink control signal through PUCCH (Physical Uplink Control Channel, an uplink control channel).

Furthermore, in the mobile communication system according to the present embodiment, the radio base station eNB is configured to transmit a downlink data signal through PDSCH (Physical Downlink Shared Channel, a downlink shared channel), and to transmit a downlink control signal through PDCCH (Physical Downlink Control Channel, a downlink control channel).

Furthermore, in the mobile communication system according to the present embodiment, the mobile station UE is configured to perform a CA communication by using UL CC#1, UL CC#2, DL CC#1, and DL CC#2.

Figure 2:
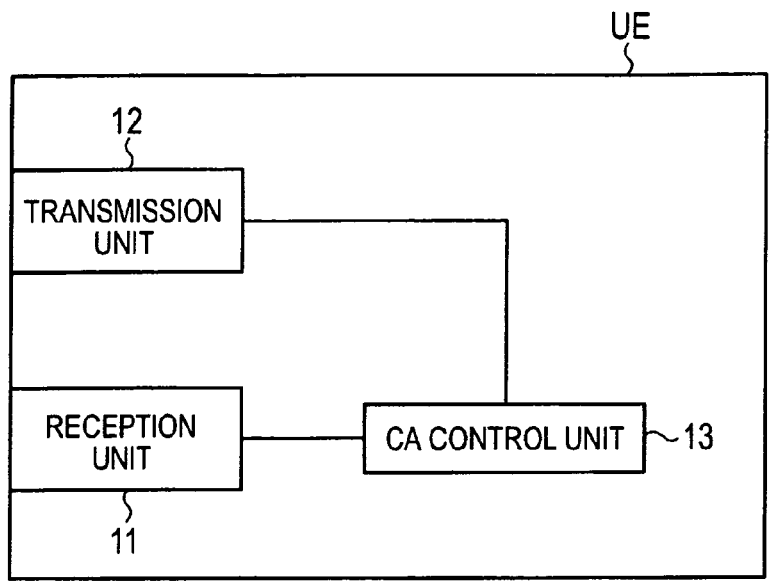
FIG. 2 is a functional block diagram of a mobile station according to the first embodiment of the present invention.

As illustrated in FIG. 2, the mobile station UE includes a reception unit 11, a transmission unit 12, and a CA control unit 13.

The reception unit 11 is configured to receive a downlink signal from the radio base station eNB through the PDSCH and the PDCCH.

The transmission unit 12 is configured to transmit an uplink signal to the radio base station eNB through the PUSCH and the PUCCH.

The CA control unit 13 is configured to control the CA communication performed by the mobile station UE.

For example, when the mobile station UE is performing the CA communication, the CA control unit 13 is configured to be able to newly add CC, delete existing CC, or change PCC (Primary Component Carrier) on an RRC layer according to an indication (specifically, an RRC message) from the radio base station eNB.

Furthermore, when the mobile station UE is performing the CA communication, the CA control unit 13 is configured to set a state (an active state or a deactive state) of each CC, which is used in the CA communication, on a MAC layer according to an indication (specifically, "MAC Control Element") from the radio base station eNB.

Furthermore, when the reception unit 11 received "UL grant" for permitting the mobile station UE to transmit an uplink data signal in particular UL CC from the radio base station eNB through PDCCH in particular DL CC, the transmission unit 12 is configured to transmit the uplink data signal through PUSCH in the particular UL CC.

Figure 3:
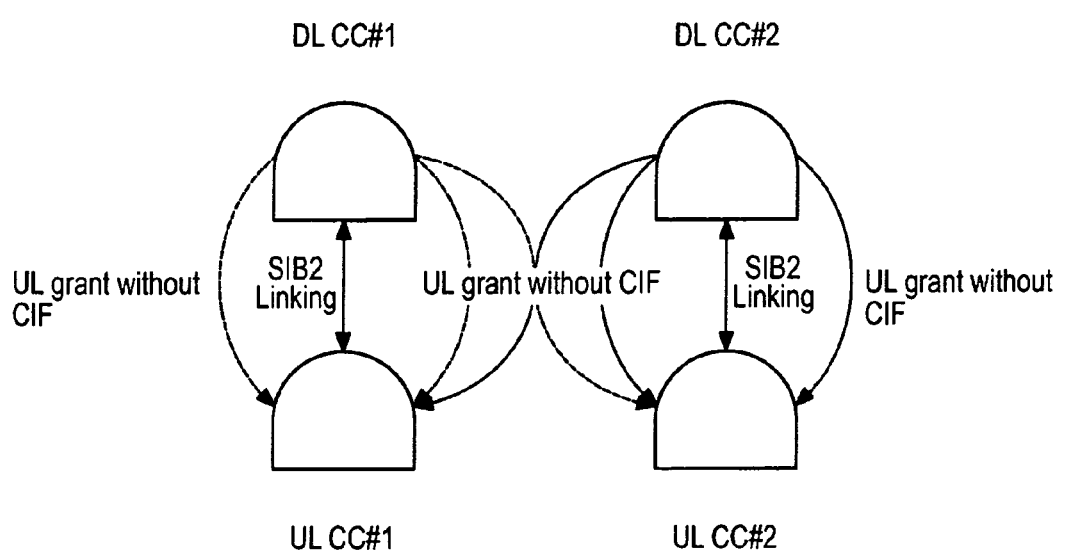
FIG. 3 is a diagram for explaining the mapping of downlink CC and uplink CC in the mobile communication system according to the first embodiment of the present invention.

In an example of FIG. 3, the radio base station eNB notifies information (SIB2 Linking) for correlating the UL CC#1 with the DL CC#1 and information (SIB2 Linking) for correlating the UL CC#2 with the DL CC#2 by SIB (System Information Block) 2.

In such a case, when the reception unit 11 received "UL grant" with no CIF (Carrier Indicator Field) from the radio base station eNB through PDCCH in the DL CC#1/#2, the transmission unit 12 is configured to transmit the uplink data signal through PUSCH in the UL CC#1/#2 corresponding to the DL CC#1/#2.

Meanwhile, when the reception unit 11 received "UL grant" with the CIF from the radio base station eNB through the PDCCH in the DL CC#1/#2, the transmission unit 12 is configured to transmit the uplink data signal through the PUSCH in the UL CC#1/#2 indicated by the CIF.

Figure 4:
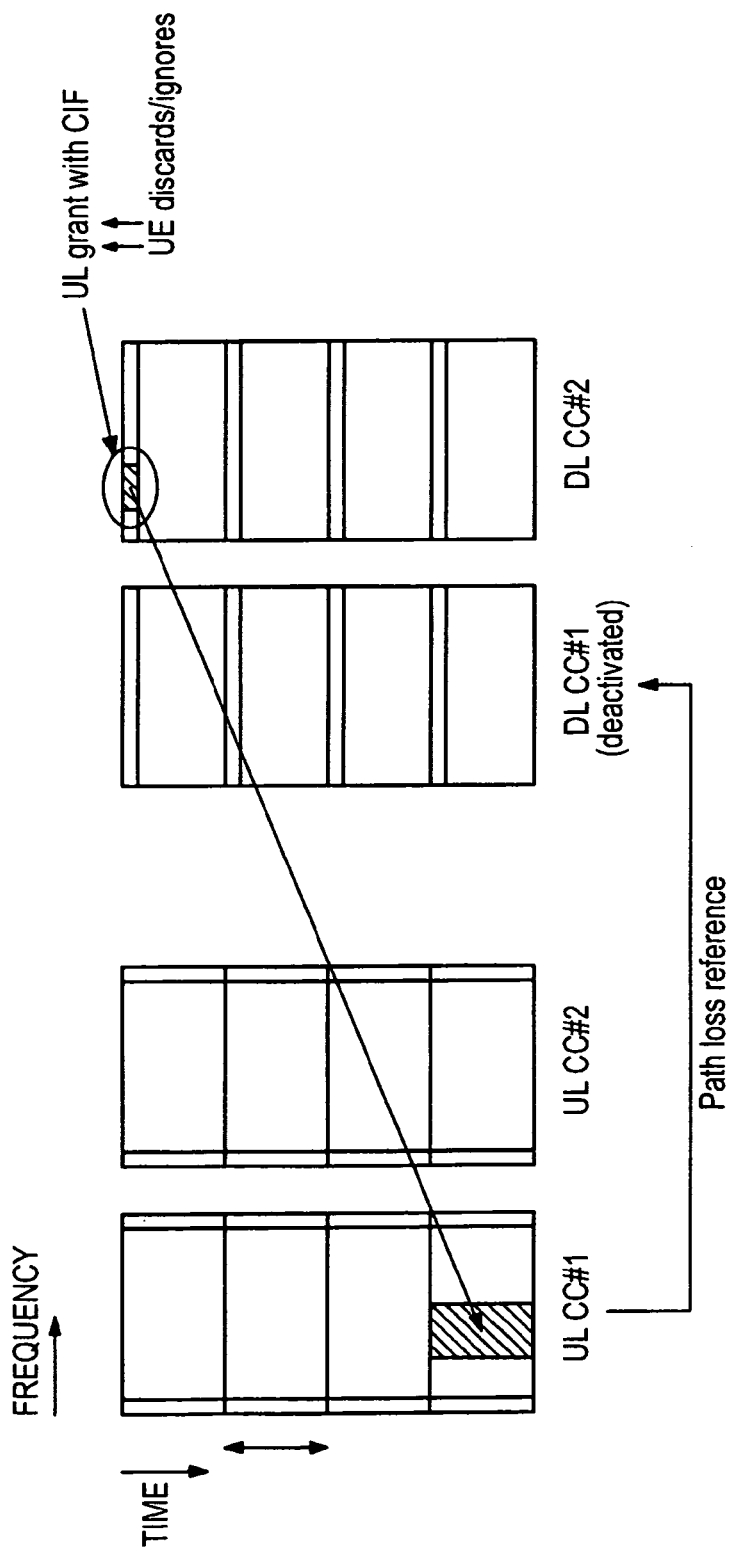
FIG. 4 is a diagram for explaining a CA communication performed in the mobile communication system according to the first embodiment of the present invention.

Furthermore, as illustrated in FIG. 4, when the reception unit 11 received the "UL grant" for permitting the mobile station UE to transmit the uplink data signal in the UL CC#1 from the radio base station eNB through the PDCCH in the DL CC#2, that is, the "UL grant" with the CIF indicating the UL CC#1, and when transmission power of the UL CC#1 is controlled on the basis of path loss estimated from the DL CC#1 in a deactive state, the transmission unit 12 is configured to discard (that is, ignore) the "UL grant".

Figure 5:
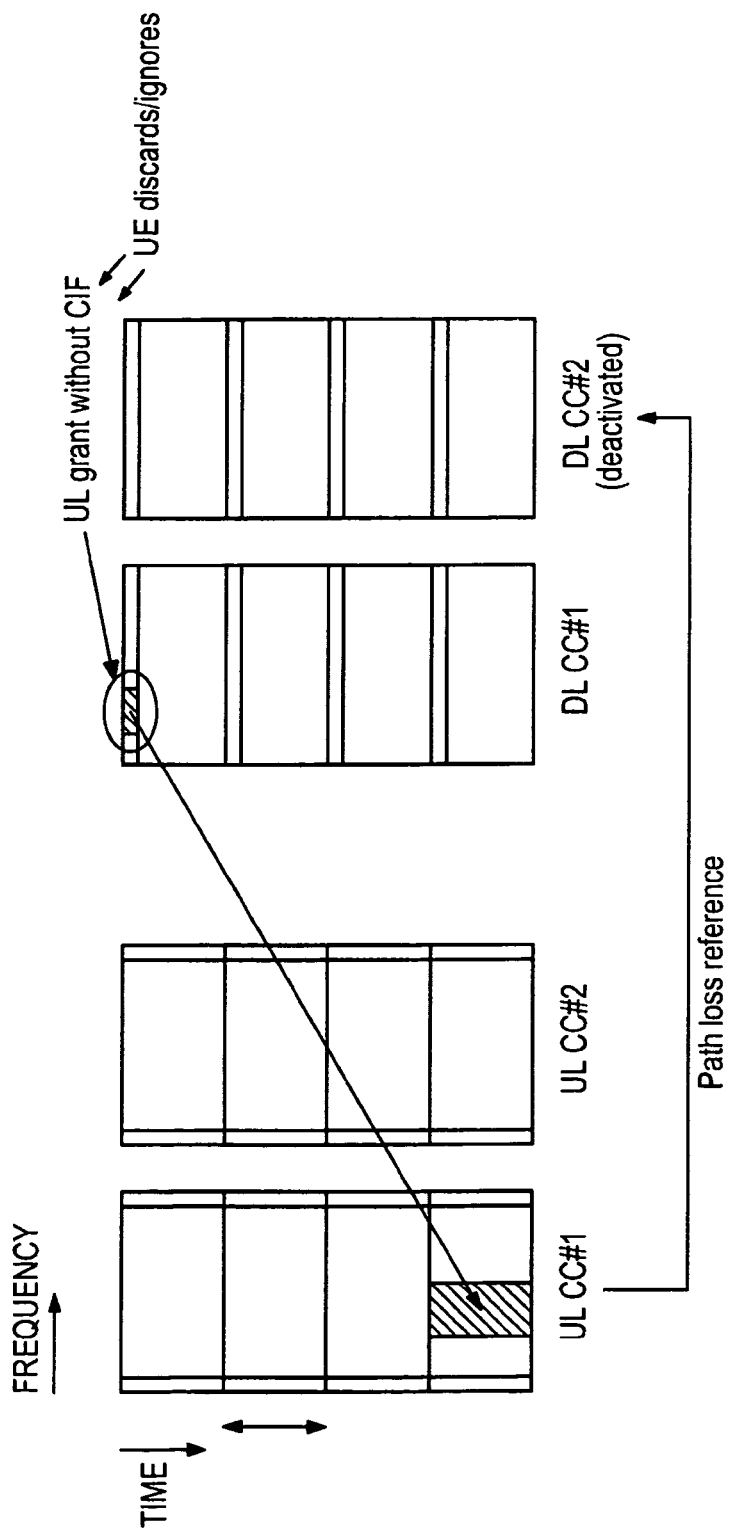
FIG. 5 is a diagram for explaining the CA communication performed in the mobile communication system according to the first embodiment of the present invention.

Moreover, as illustrated in FIG. 5, when the DL CC#1 is correlated with the UL CC#1 by the SIB2 Linking, when the reception unit 11 received the "UL grant" with no CIF from the radio base station eNB through the DL CC#1, and when the transmission power of the UL CC#1 is controlled on the basis of path loss estimated from the DL CC#2 in a deactive state, the transmission unit 12 is configured to discard (that is, ignore) the "UL grant".

In addition, in the above, the case in which the mobile station UE receives the "UL grant" through the PDCCH also includes a case in which the mobile station UE erroneously detects the "UL grant" although the PDCCH (the "UL grant") was not actually transmitted to the mobile station UE from the radio base station eNB.

Specifically, the PDCCH (the "UL grant") is provided with an error detection bit sequence (a CRC bit sequence) masked by a mobile station UE-specific identifier (C-RNTI) for permitting the transmission of the uplink data signal through the PUSCH, and when it is determined that an inspection result based on a CRC bit sequence unmasked by the C-RNTI, which was assigned to the mobile station UE, of the received PDCCH (the "UL grant") is "OK", the mobile station UE detects that the PDCCH (the "UL grant") was assigned to the mobile station UE. However, the aforementioned case also includes a case in which the mobile station UE erroneously determines the inspection result based on the CRC bit sequence of the PDCCH (the "UL grant") as "OK" although the PDCCH (the "UL grant") was not actually transmitted to the mobile station UE from the radio base station eNB.

A description will now be provided for the operation of the mobile station UE in the mobile communication system according to the present embodiment, with reference to FIG. 6.

As illustrated in FIG. 6, when "UL grant" for permitting the transmission of an uplink data signal in particular UL CC is received in step S101, the mobile station UE determines whether transmission power of the particular UL CC is controlled on the basis of path loss estimated from DL CC in a deactive state in step S102.

When it is determined that the transmission power of the particular UL CC is controlled on the basis of the path loss estimated from the DL CC in the deactive state, the mobile station UE discards (or ignores) the "UL grant" in step S103.

Meanwhile, when it is determined that the transmission power of the particular UL CC is controlled on the basis of path loss estimated from DL CC in an active state, the mobile station UE transmits the uplink data signal to the radio base station eNB through PUSCH on the basis of the "UL grant" in step S104.

In accordance with the mobile communication system according to the present embodiment, it is possible for the mobile station UE to stop the transmission of an uplink data signal in UL CC, and thus it is possible to avoid unnecessary interference, wherein the transmission power of the UL CC is controlled on the basis of path loss estimated from DL CC in a deactive state.

The characteristics of the present embodiment as described above may be expressed as follows.

A first characteristic of the present embodiment is summarized in that a mobile communication method, in which a mobile station UE performs a CA communication with a radio base station eNB by using a plurality of DL CCs (downlink carriers) and a plurality of UL CCs (uplink carriers) which have carrier frequencies different from each other, includes: a step A of receiving, by the mobile station UE, "UL grant (a scheduling signal)" for permitting the mobile station UE to transmit an uplink data signal in UL CC#1 (a predetermined uplink carrier) through PDCCH (a physical downlink control channel) in DL CC#2 (a first downlink carrier); and a step B of discarding, by the mobile station UE, the "UL grant" when transmission power of the UL CC#1 is controlled on the basis of path loss estimated from DL CC#1 (a second downlink carrier) in a deactive state.

In the first characteristic of the present embodiment, in the step A, the mobile station UE may receive CIF (a carrier indicator) indicating the UL CC#1 together with the "UL grant".

In the first characteristic of the present embodiment, the mobile communication method may include a step of notifying, by the radio base station eNB, the mobile station UE of information for correlating the UL CC#1 with the DL CC#2 by broadcast information (SIB2).

A second characteristic of the present embodiment is summarized in that a mobile station UE, which is configured to be able to perform a CA communication with a radio base station eNB by using a plurality of DL CCs and a plurality of UL CCs which have carrier frequencies different from each other, includes: a reception unit 11 configured to receive "UL grant" for permitting the mobile station UE to transmit an uplink data signal in UL CC#1 through PDCCH in DL CC#2, wherein, when transmission power of the UL CC#1 is controlled on the basis of path loss estimated from DL CC#1 in a deactive state, the reception unit 11 is configured to discard the "UL grant".

Note that the operation of the mobile station UE or the radio base station eNB may be performed by hardware, a software module performed by a processor, or a combination of the both.

The software module may be arranged in a storage medium of an arbitrary format such as a RAM (Random Access Memory), a flash memory, a ROM (Read Only Memory), an EPROM (Erasable Programmable ROM), an EEPROM (Electronically Erasable and Programmable ROM), a register, a hard disk, a removable disk, or a CD-ROM.

The storage medium is connected to the processor so that the processor can write and read information into and from the storage medium. Such a storage medium may also be accumulated in the processor. Such a storage medium and processor may be arranged in an ASIC. The ASIC may be arranged in the mobile station UE or the radio base station eNB. Furthermore, such a storage medium and processor may be arranged in the mobile station UE or the radio base station eNB as discrete components.

Thus, the present invention has been explained in detail by using the above-described embodiments; however, it is obvious that for persons skilled in the art, the present invention is not limited to the embodiments explained herein. The present invention can be implemented as a corrected and modified mode without departing the gist and the scope of the present invention defined by the claims. Therefore, the description of the specification is intended for explaining the example only and does not impose any limited meaning to the present invention.

INDUSTRIAL APPLICABILITY

As described above, according to the present invention, it is possible to provide a mobile communication method and a mobile station, by which it is possible to reduce interference in a CA communication.

REFERENCE SIGNS LIST eNB . . . Radio base station
UE . . . Mobile station
11 . . . Reception unit
12 . . . Transmission unit
13 . . . CA control unit

The invention claimed is:

1. A mobile communication method, in which a mobile station communicates with a radio base station by using a plurality of downlink carriers and a plurality of uplink carriers, each of which has a different carrier frequency, the method comprising:
   a step A of receiving, by the mobile station, a scheduling signal for permitting the mobile station to transmit an uplink data signal in a predetermined uplink carrier through a physical downlink control channel in a first downlink carrier; and
   a step B of ignoring, by the mobile station, the scheduling signal when transmission power of the predetermined uplink carrier is controlled on the basis of path loss estimated from a second downlink carrier, if the second downlink carrier is set to a deactive state.

2. The mobile communication method according to claim 1, wherein, in the step A, the mobile station receives a carrier indicator indicating the predetermined uplink carrier together with the scheduling signal.

3. The mobile communication method according to claim 1, further comprising: a step of notifying, by the radio base station, the mobile station of information for correlating the predetermined uplink carrier with the first downlink carrier by broadcast information.

4. A mobile station configured to be capable of communicating with a radio base station by using a plurality of downlink carriers and a plurality of uplink carriers, each of which has a different carrier frequency, the mobile station comprising:
   a reception unit configured to receive a scheduling signal for permitting the mobile station to transmit an uplink data signal in a predetermined uplink carrier through a physical downlink control channel in a first downlink carrier, wherein
   when transmission power of the predetermined uplink carrier is controlled on the basis of path loss estimated from a second downlink carrier, the reception unit is configured to ignore the scheduling signal, if the second downlink carrier is set to a deactive state.

* * * * *